United States Patent Office 3,462,677
Patented Aug. 19, 1969

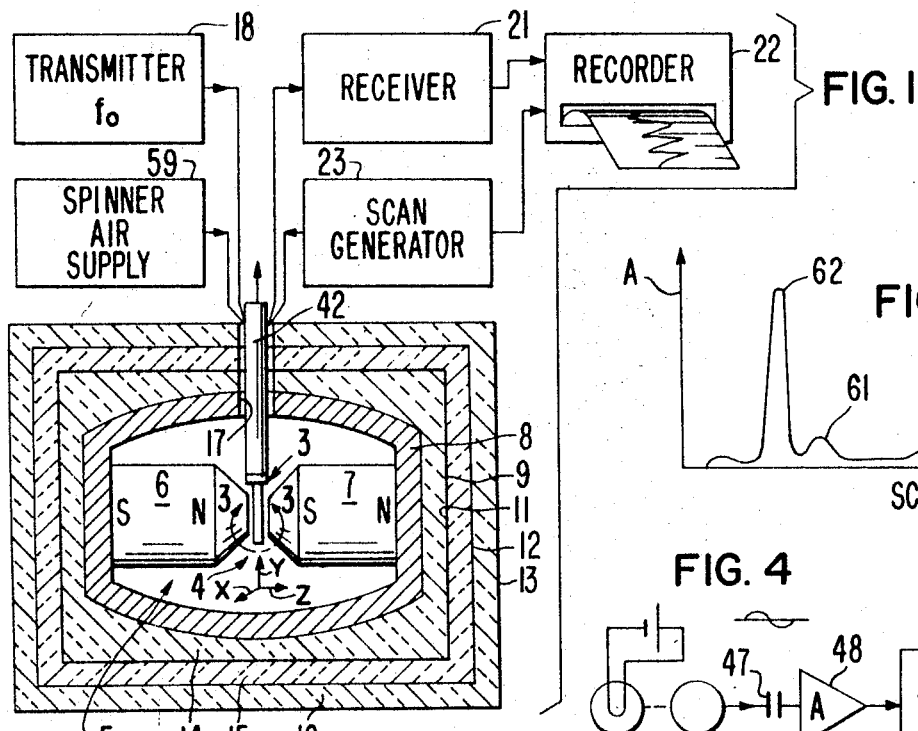
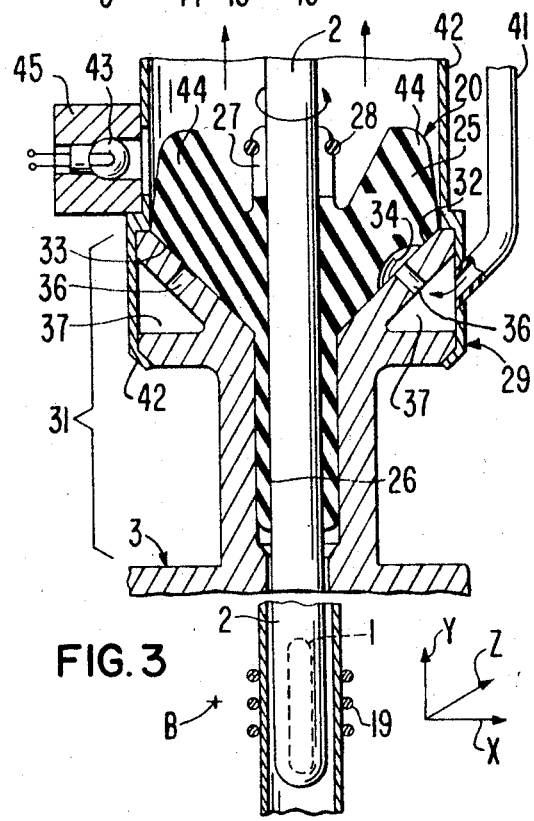
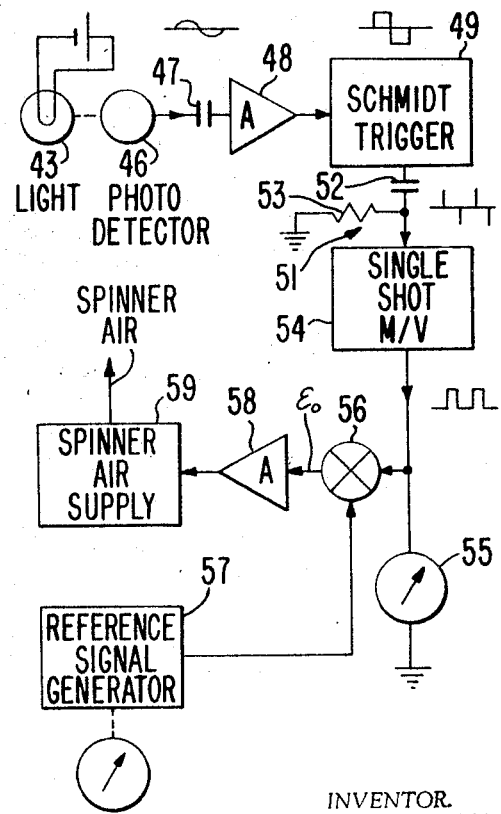
Aug. 19, 1969  R. M. PAITICH  3,462,677
GYROMAGNETIC RESONANCE SPECTROMETER HAVING MEANS
FOR MEASURING THE RATE OF SAMPLE ROTATION
Filed June 12, 1967
INVENTOR.
RONALD M. PAITICH

3,462,677
GYROMAGNETIC RESONANCE SPECTROMETER HAVING MEANS FOR MEASURING THE RATE OF SAMPLE ROTATION
Ronald M. Paitich, Los Altos, Calif., assignor to Varian Associates, Palo Alto, Calif., a corporation of California
Filed June 12, 1967, Ser. No. 645,395
Int. Cl. G01r 33/08
U.S. Cl. 324—.5                                7 Claims

ABSTRACT OF THE DISCLOSURE

A gyromagnetic resonance spectrometer is disclosed which includes means for spinning the sample for line narrowing and means for measuring the rate of sample rotation. The spectrometer includes a radio frequency transmitter and receiver for exciting and detecting resonance of a sample immersed in a unidirectional polarizing magnetic field. The magnetic field is produced by a permanent magnet having an egg-shaped yoke structure which envelops its magnetic gap in which the sample is immersed as contained in a probe structure. The magnet is enveloped by an oven structure and a plurality of thermal insulative foam jackets for holding the magnet at a constant temperature. Thus, the probe is buried inside the magnet and hidden from the view of the operator. An air turbine is provided in the probe structure for rotating the sample to average residual field gradients and, thus, to narrow the resonance lines of the sample. Light is directed onto the rotator of the air turbine. Discontinuities on the rotator modulate the light at a frequency proportional to its and, thus, the sample's rate of rotation. A photo detector picks up the modulated light and converts the light modulation into a signal which is measured to indicate the rate of sample rotation. In a preferred embodiment the measured rotation is compared with a reference signal to yield an error signal for controlling the air supply to the turbine, thereby causing the sample to rotate at a preselected speed which is variable, as desired.

Description of the prior art

Heretofore, gyromagnetic resonance spectrometers have employed air turbines to spin the sample for line narrowing. In certain electromagnet systems for supplying the polarizing magnetic field, an open yoke structure exists which permits the operator to observe the spinning rotator of the air turbine. In such systems, it has been possible for the operator to determine that the sample is spinning and to very roughly estimate its rate of rotation by observing a strobe-effect on the turbine rotator caused by the 60 cycle or 50 cycle flicker of fluorescent lighting if present.

However, in permanent magnet systems, the magnet includes a yoke structure, an oven structure, and insulative jackets, all of which enclose the air turbine, thereby obscuring the operator's view of the turbine rotator and preventing even crude estimates of the sample spinning rate or even whether the sample is spinning.

Once a resonance spectrum is obtained, a skilled operator may note the position of the spinning sideband resonance peak relative to a main peak for a measure of the rate of sample rotation. However, such peaks are sometimes difficult to distinguish from other peaks and this method of measuring spinner rotation rates is less than satisfactory for use by a relatively unskilled operator.

The rate of sample rotation is important to performance of the spectrometer. If the rotation is too slow, the spinning sidebands merge into a broad resonance line to be measured. If the rotation is too fast, the sample tends to form a vortex in the sample container and/or begins to vibrate due to unbalance of the rotator and this reduces the sensitivity of the spectrometer or introduces noise onto the output spectrum. A rotation rate of 25 to 40 revolutions per second is generally found to provide satisfactory performance.

Summary of the present invention

The principal object of the present invention is the provision of an improved gyromagnetic resonance spectrometer.

One feature of the present invention is the provision, in a gyromagnetic resonance spectrometer employing a sample spinner, of directing light onto the spinning sample rotator and measuring the frequency of modulation of the light by the rotator to yield a measure of the rate of sample rotation, whereby the operator obtains an accurate measure of the rate of sample rotation.

Another feature of the present invention is the same as the preceding feature wherein the sample and rotator are obscured from view of the operator by being enveloped by the yoke, oven, and thermal jackets of a magnet system, which have heretofore prevented the operator from making even crude visual observations of spinning rates.

Another feature of the present invention is the same as any one or more of the preceding features wherein a photo detector is employed for detecting the modulation of the light which is directed onto the sample rotator.

Another feature of the present invention is the same as any one or more of the preceding features including a closed-loop controller for comparing the measured spinning rate with a reference input to obtain an error output for bringing the spinning rate into coincidence with the reference, whereby the operator can select a certain rate of sample rotation to be automatically maintained by the controller.

Other features and advantages of the present invention will become apparent upon perusal of the following specification taken in connection with the accompanying drawings wherein:

Brief description of the drawings

FIG. 1 is a schematic drawing, partly in section and partly in block diagram form, of a spectrometer incorporating features of the present invention, FIG. 2 is a spectrum of a sample under analysis, FIG. 3 is an enlarged fragmentary view, partly in section, of a portion of the structure of FIG. 1 delineated by line 3—3 and turned 90°, and FIG. 4 is a schematic circuit diagram of the spinner control circuit of the present invention.

Description of the preferred embodiments

Referring now to FIGS. 1 and 3, there is shown a nuclear magnetic resonance spectrometer incorporating features of the present invention. A sample of matter 1 to be analyzed is disposed in a sample vial 2 within a probe housing 3 and immersed in a unidirectional polarizing magnetic field Ho produced in the gap 4 of a permanent magnet 5.

The magnet 5 includes a pair of axially directed permanent magnets 6 and 7 with their adjacent ends spaced apart to form the gap 4. An egg-shaped magnetic yoke 8, as of soft iron, interconnects the far poles of the magnets 6 and 7 to form a flux return path around the magnets 6 and 7. In addition, the yoke structure 8 encloses the gap 4 for magnetically shielding the gap 4 from external magnetic effects. Four hollow cylindrical metal enclosures are concentrically disposed around the yoke 8. They include an oven 9 and three magnetic shields 11, 12 and 13. Magnetic shields 11 and 12 are made of $\mu$-metal and the outermost shield 13 is made of iron. The inner shield 11 is disposed adjacent the inside surface of the oven 9. Three thermally insulative polyurethane foam jackets 14, 15 and 16 are concentrically disposed surrounding the magnet yoke 8. An insulative thermal jacket is disposed between each of the adjacent magnetic shields. The innermost jacket 14 is disposed between the yoke 8 and the first shield 11. The foam jackets serve to provide thermal lagging for the magnet 5 and oven 9.

The oven maintains the magnet 5 at a constant temperature of 36° C. ± 0.001° C. for stabilizing the polarizing field H$o$ at a high intensity, as of 14.1 kg. An access bore 17 in the yoke 8 and enclosing structures is provided for inserting the probe 3 into the gap 4.

A radio frequency transmitter 18 supplies R.F. energy, at a frequency as of 60 mHz., to a tuned coil 19 in the probe 3 adjacent the sample 1. The transmitter energy which is applied to the coil 19 serves to irradiate the sample with a radio frequency magnetic field to produce nuclear resonance of the sample 1. Resonance signals emanating from the sample 1 are picked-up in the coil 19 and fed to a radio frequency receiver 21 wherein they are amplified and detected to produce an output resonance signal. The resonance signal is fed to one input of a recorder 22 and recorded versus a scan signal derived from scan generator 23 to produce a recorder output spectrum, as shown in FIG. 2. The scan generator 23 serves to scan the polarizing magnetic field intensity in the sample 1 through the various resonance lines of the sample 1.

In spite of the great care exercised in fabrication of the probe 3 and magnet 5, certain minute residual gradients of the polarizing magnetic field exist in the sample 1. These residual gradients are on the order of 1.0 milligauss per centimeter and serve to broaden the resonance lines of the sample 1. Certain of these gradients in the X and Z direction are averaged out by spinning the sample 1 about the Y axis at a suitable rate of sample rotation such as, for example, between 25 and 40 revolutions per second (r.p.s.). The result of the sample spinning is to narrow the resonance lines of the sample spectrum.

An air driven turbine 20 is conventionally employed to spin the sample 1. The air turbine 20 includes an elongated rotator 25 made of a non-magnetic, non-conductive material such as Delrin plastic, a product of Dupont. The rotator 25 includes an axial bore 26 which receives the tubular glass sample vial 2 therein. The upper end of the rotator 25 is axially slotted to form a plurality of axial fingers 27. An elastic O-ring 28 is placed around the fingers 27 to pull the fingers 27 against the vial 2, thereby gripping the vial 2 for rotation thereof.

A stator portion 29 of the air turbine 20 is formed in the upper end of an upstanding neck portion 31 of the aluminum probe housing 3. The stator portion 29 includes a frusto-conical bearing surface 32 formed in the upper end of the neck portion 29 to mate with a frusto-conical bearing surface 33 of the rotator 25. A plurality of air buckets 34 are formed about the circumference of the rotator bearing surface 33 to catch air circumferentially directed at the buckets 34 through air passageways 36 communicating with an air distribution manifold 37 formed in and extending around the stator 29.

Air which is preheated to the magnet temperature and supplied at a flow rate of between 0.3 to 0.5 cubic feet per minute is fed into the manifold 37 via a thermally insulative plastic tubing 41. The air courses around the rotator 25 rotating same and exhausts out a tubular flue 42 which is made of a thermally conductive material, such as aluminum, inside the yoke structure 8 and of a thermally insulative material for its length outside the yoke 8. The air serves not only to spin the rotator 25 and sample 1 but also serves as a lubricant between the bearing surfaces 33 and 32 of the rotator 25 and stator 29, respectively.

The rate of rotation of the rotator 25 and sample 1 is measured by directing light from an incandescent bulb 43 onto the portion of the rotator 25 which includes a pair of diametrically opposed wings 44. The bulb 43 is mounted in a recessed housing 45 affixed to the side of the chimney 42. As the wings 44 pass the light beam the light which is reflected from the rotator 25 is reflected differently, i.e. modulated. A photo detector 46 (see FIG. 4) is mounted adjacent the light bulb 43 in the housing 45. The photo detector 46 which is circumferentially spaced from the bulb 43 picks up the modulated light reflected from the rotator 25. The modulation is superimposed on a D.C. voltage of about 6 volts and comprises two modulation peaks per revolution of the sample 1. Thus, the modulation frequency is proportional to the rate of rotation of the sample 1 and a measure of the modulation frequency is a measure of the rate of rotation.

A coupling capacitor 47 couples the audio modulation to an audio amplifier 48 wherein it is amplified by 30 db and fed to a Schmitt trigger 49. The trigger 49 shapes the input signal into a square wave signal which is fed to a differentiator 51 comprising series capacitor 52 and shunt resistor 53. The differentiator 51 converts the square wave into a succession of positive and negative spikes, the spikes of like sign being at the modulation frequency. The output of the differentiator 51 is fed to a monostable multivibrator 54 which produces a train of short output pulses of fixed width and height but having a spacing between pulses proportional to the modulation frequency and, thus, the rate of sample rotation. The D.C. average of the output of the monostable multivibrator 54 is, thus, a measure of the rate of sample rotation. The output of the multivibrator 54 is fed to a D.C. microammeter 55 to yield a measure of, and to indicate to the operator, the rate of sample rotation.

A sample of the output of the one shot multivibrator 54 is also fed to one input of an error detector 56 wherein it is compared with a D.C. reference signal as generated by a reference signal generator 57 to produce an output error signal $\epsilon_0$. The error signal $\epsilon_0$ is proportional to the difference between the reference signal amplitude and the amplitude of the output of the multivibrator 54. The error signal $\epsilon_0$, if any, is amplified by amplifier 58 and fed to control an air flow control valve in an air supply 59 for the air turbine 20.

Thus, the rate of sample rotation is precisely controlled to a rate which is selected by the control knob on the reference signal generator 57. Using the control circuit of FIG. 4, the rate of sample rotation is accurately measured and controlled to within 2% of the selected rate. The selected rate is typically between 25 and 40 revolutions per second. If the sample rotation rate is set too low, the spinning sideband, shown at 61 in the spectrum of FIG. 2, will merge with the adjacent line at 62 and insufficient line narrowing will be obtained. If the sample spinning rate is set too high, the sample will tend to climb the inside walls of the vial 2 and thereby reduce the sensitivity of the spectrometer. Spinning sidebands are easily detected with the system of FIG. 4 merely by observing if the sideband 61 is spaced from the main peak 62 by the same number of cycles per second as the indicated rate of sample rotation. If doubt still exists the spinning rate can be changed to see if the peak in question changes frequency relative to the main peak 62.

Although the wing 44 were employed in the rotator structure of FIG. 3 to produce modulation of the reflected light, other types of light reflective discontinuities may be employed such as, for example, spots of light reflective or absorptive paint.

What is claimed is:

1. In a gyromagnetic resonance spectrometer apparatus, means for exciting and detecting gyromagnetic resonance of a sample of matter immersed in a unidirectional polarizing magnetic field, means for spinning the sample in the polarizing magnetic field to average out certain residual magnetic field gradients in the polarizing magnetic field to narrow the resonance lines of the sample, the improvement comprising, means for directing light onto a rotating portion of said sample spinning means, means on said sample spinning means for modulating the light in proprotion to the rate of rotation of the sample, and means for detecting and measuring a component of the light modulation frequency to obtain a measure of the rate of rotation of the sample.

2. The apparatus of claim 1 including a magnet means for producing the unidirectional polarizing magnetic field in the sample, said magnet including a pair of axially directed magnets with their adjacent ends spaced apart to define a magnetic gap in which the sample is immersed, and means forming a magnetic structure interconnecting the far ends of said permanent magnets and enclosing said magnets and the gap for shielding the gap from external magnetic effects and for providing a magnetic flux return path around said magnets and said rotating portion of said sample spinning means, onto which the light is directed, being enclosed by said magnetic structure.

3. The apparatus of claim 2 wherein said light directing means and said modulated light detecting means are enclosed by said yoke structure.

4. The apparatus of claim 3 wherein said light detecting means includes a photo detector for receiving the modulated light and for converting the modulated light into a time varying electrical signal containing frequency components proportional to the rate of rotation of the sample.

5. The apparatus of claim 4 wherein said means for detecting and measuring the light modulation frequency includes means for measuring certain frequency components of the electrical output signal of said photo detector.

6. The apparatus of calim 1 including means for generating a reference output proportional to a selected rate of rotation for said sample, means for deriving a measured output from said light detecting and measuring means proportional to the rate of rotation of the sample, means for comparing the reference output against the measured output to derive an error output proportional to their difference, and means responsive to the error output for changing the rate of rotation of the sample to bring it to the selected rate of rotation.

7. The apparatus of claim 1 wherein said sample spinning means includes an air driven turbine coupled to the sample.

References Cited

UNITED STATES PATENTS 2,960,649  11/1960  Bloch _____ 324—0.5
3,172,035  3/1965  Arnold _____ 324—0.5

RUDOLPH V. ROLINEC, Primary Examiner

MICHAEL J. LYNCH, Assistant Examiner